UNITED STATES PATENT OFFICE.

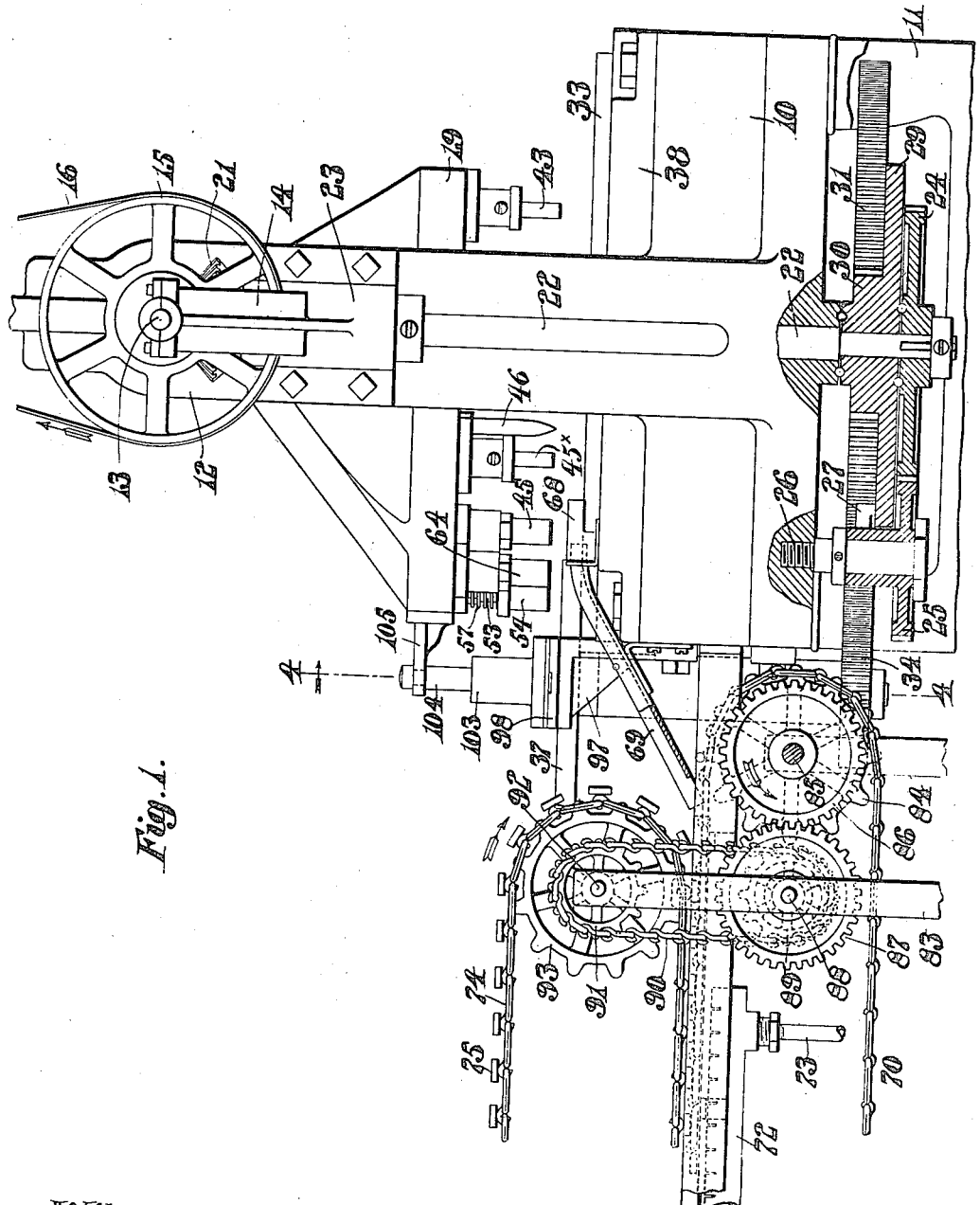

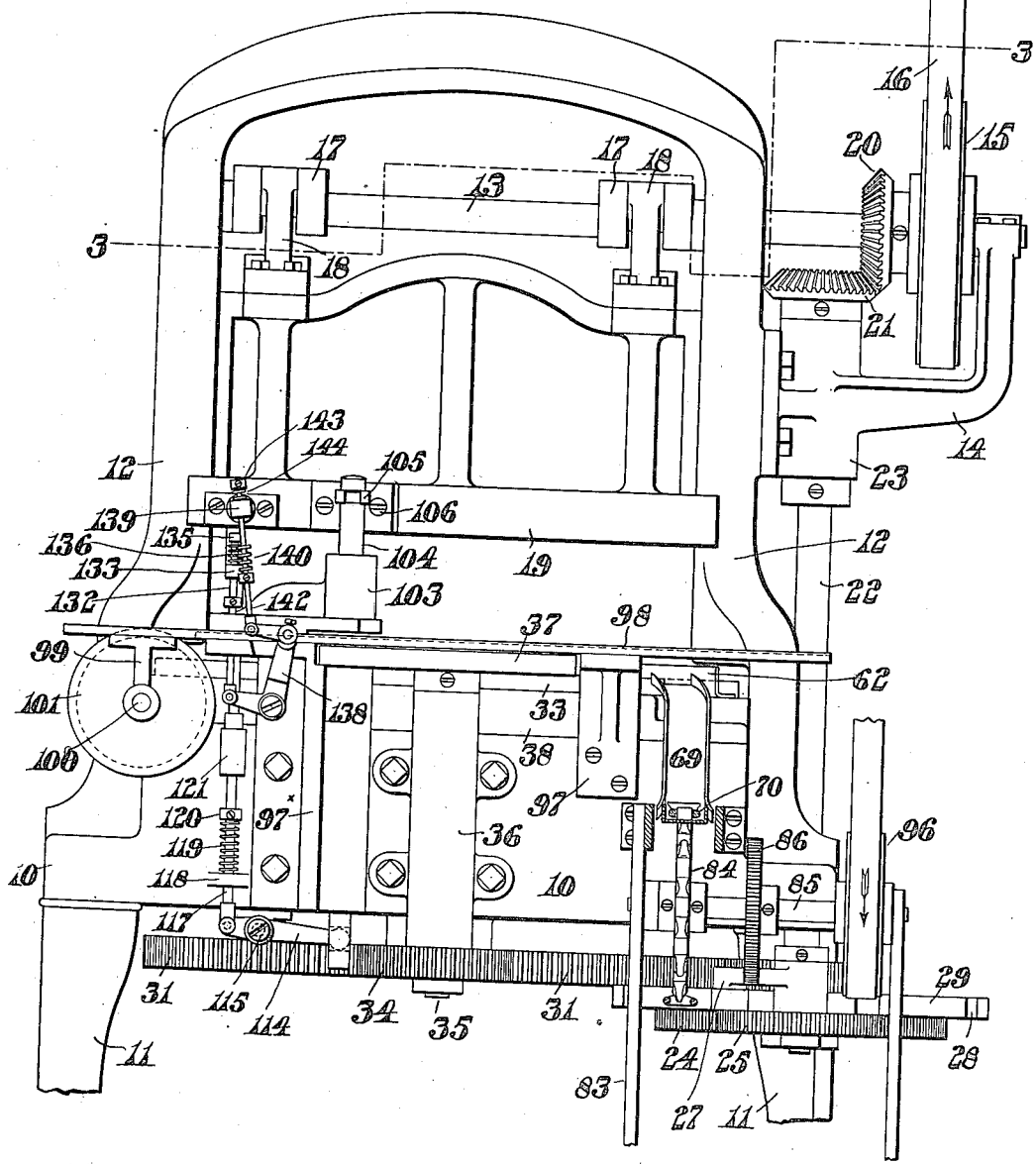

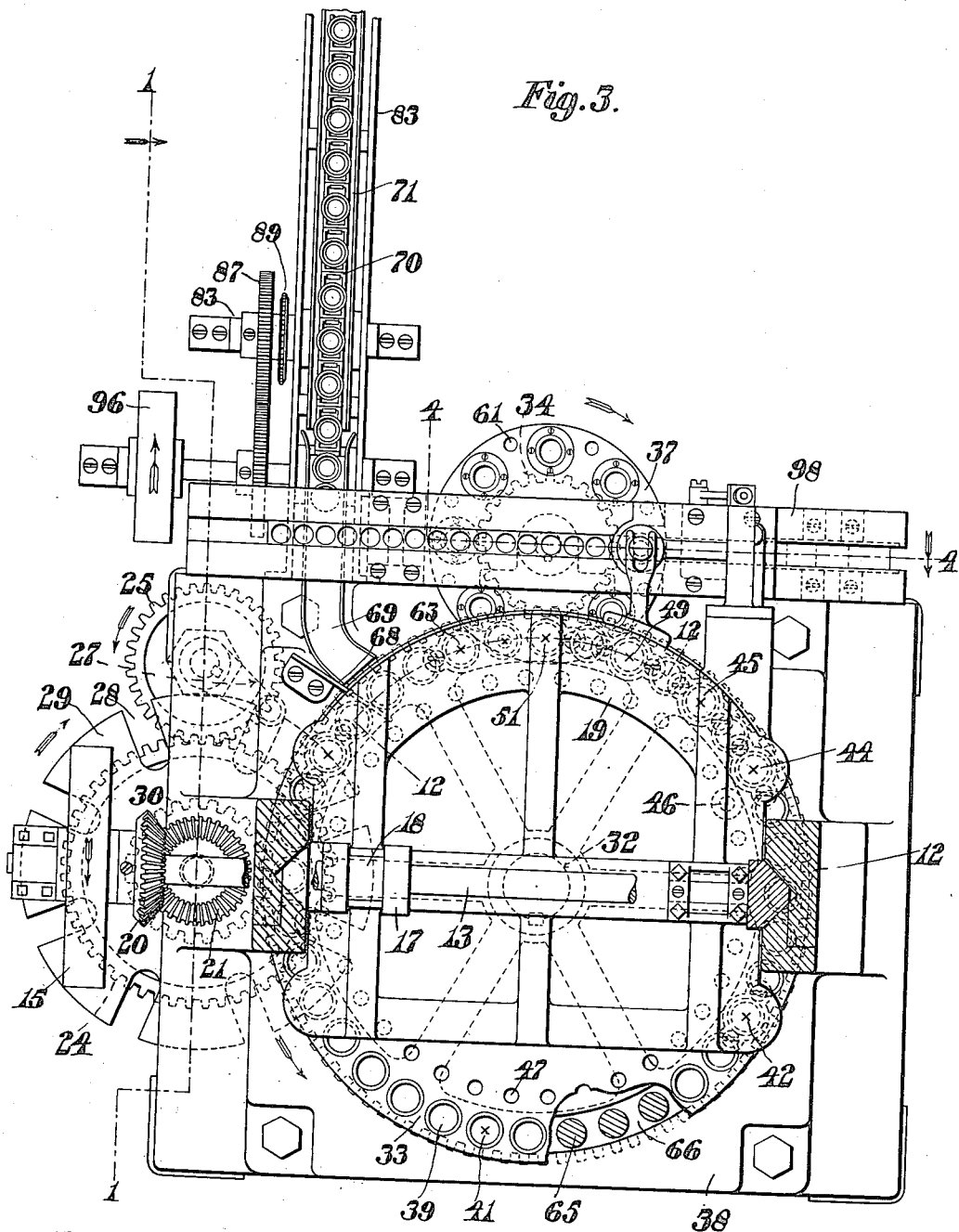

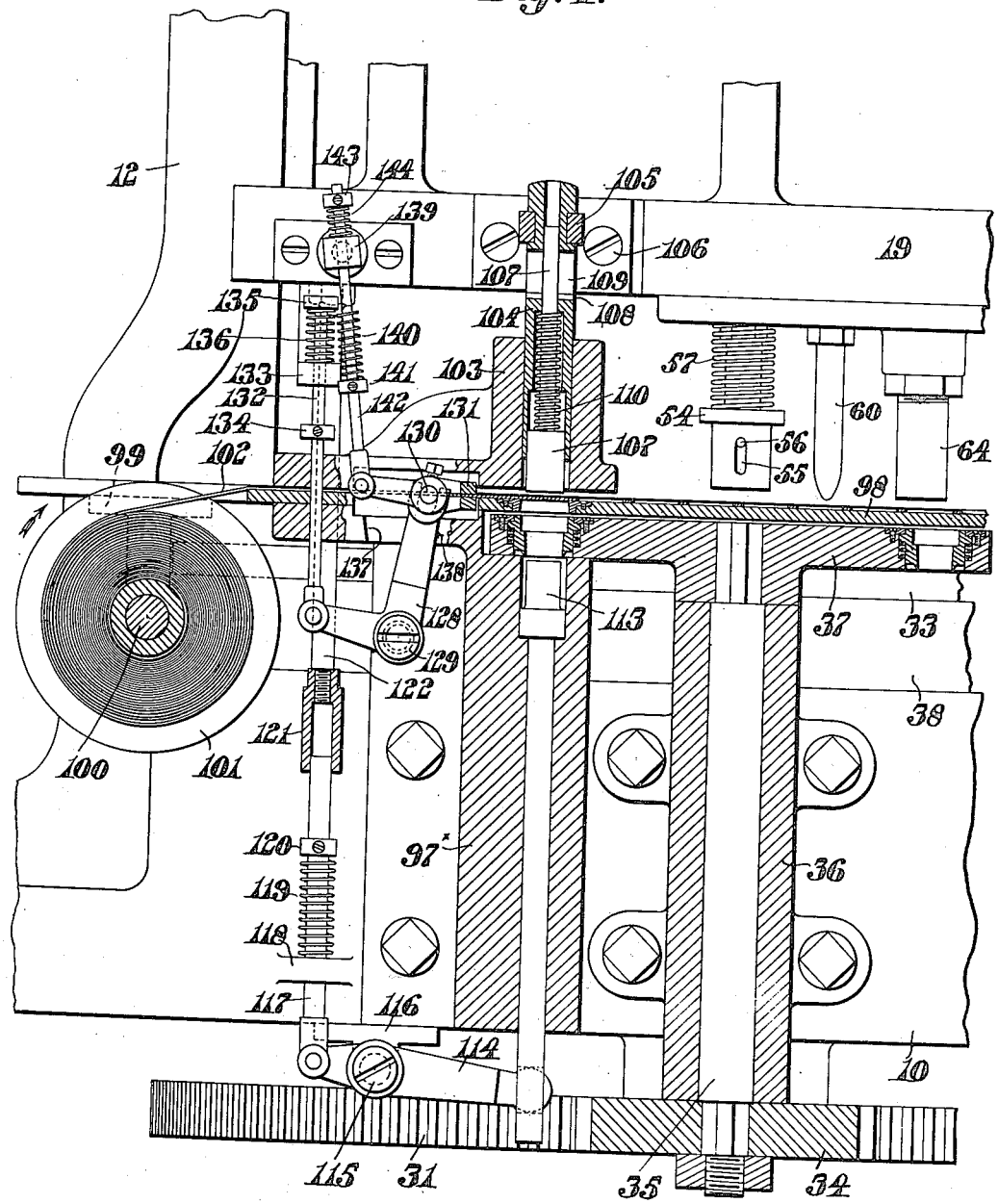

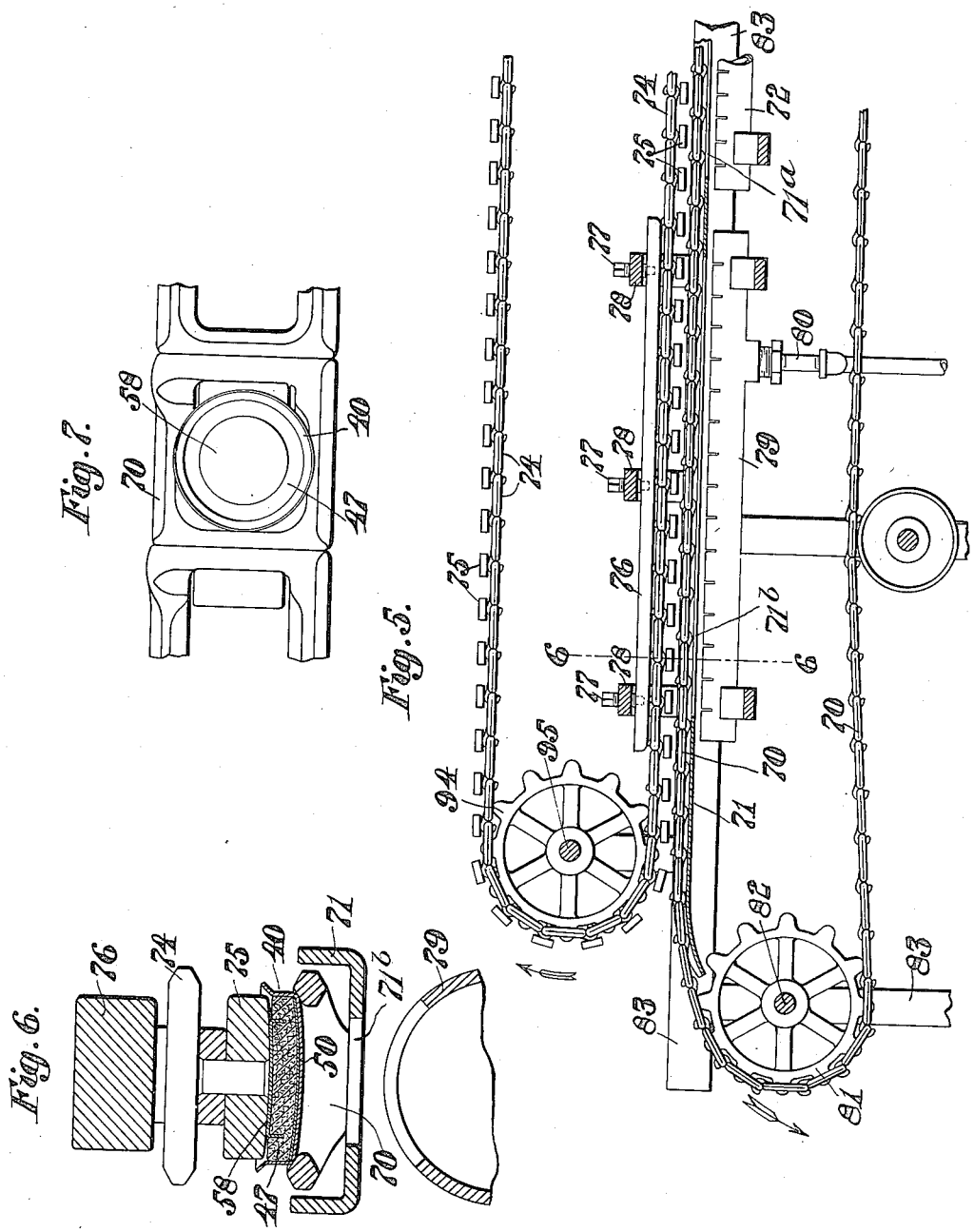

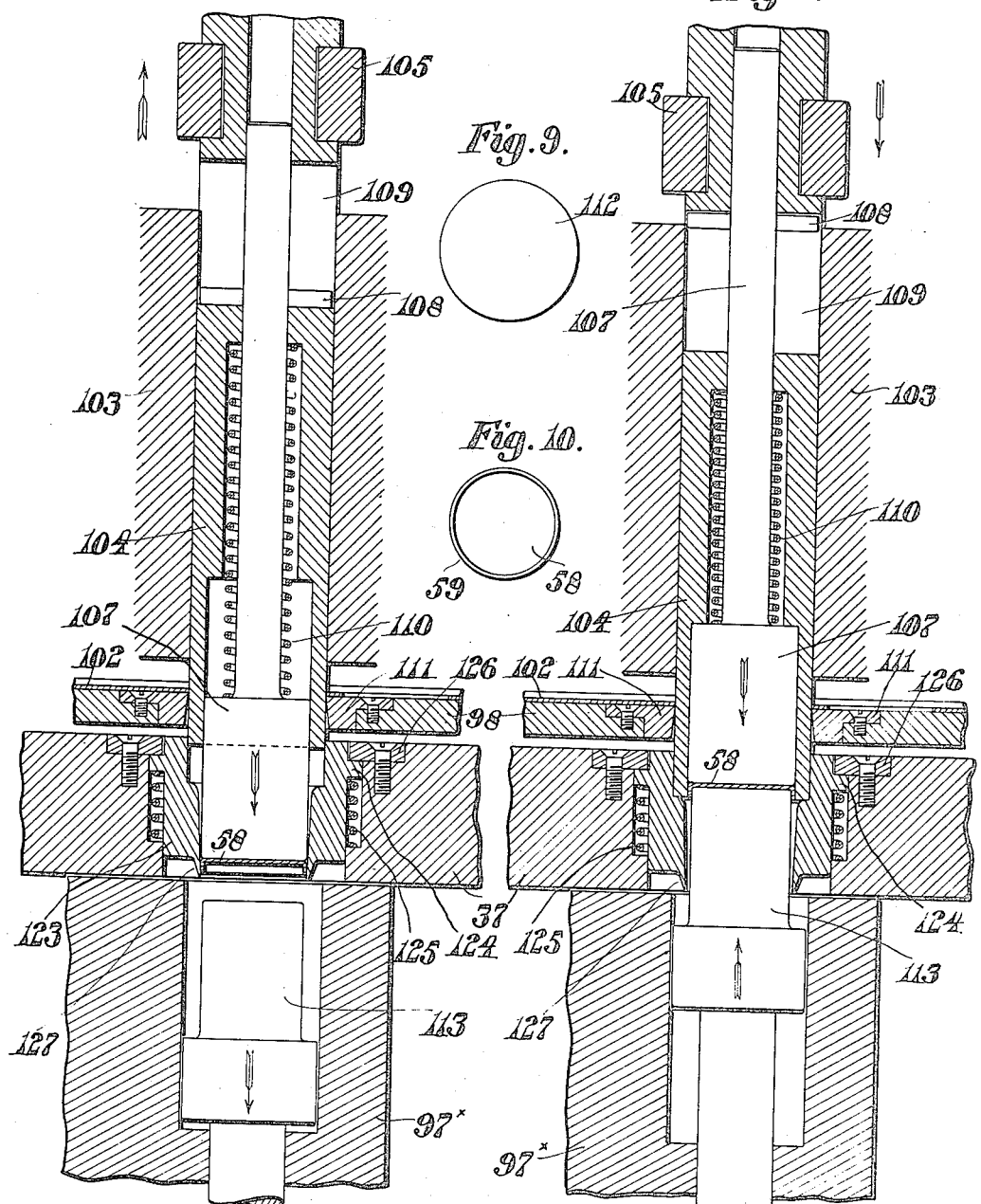

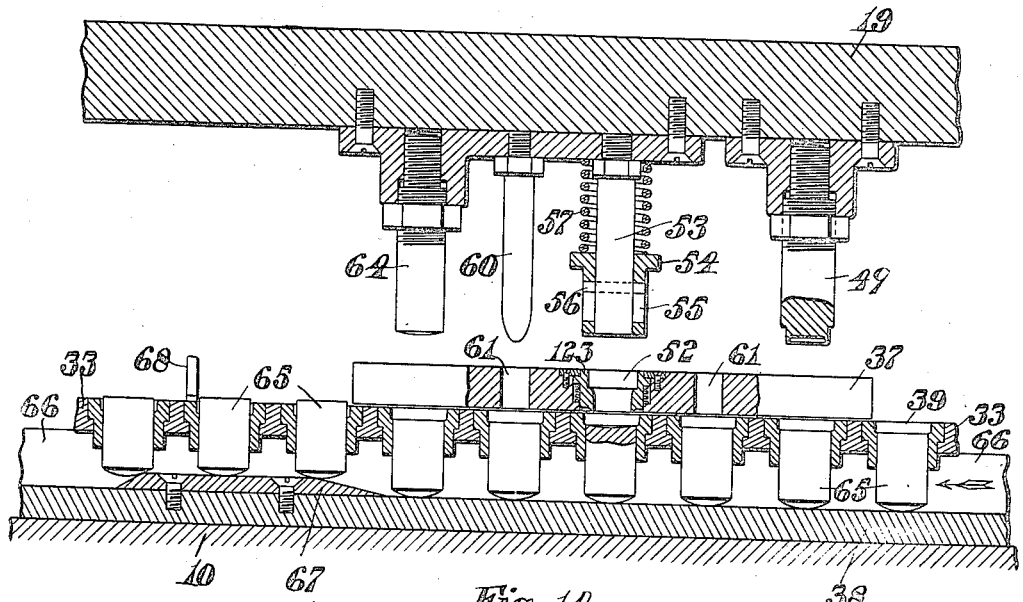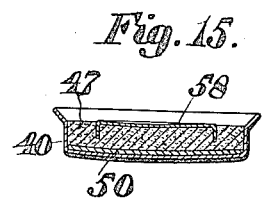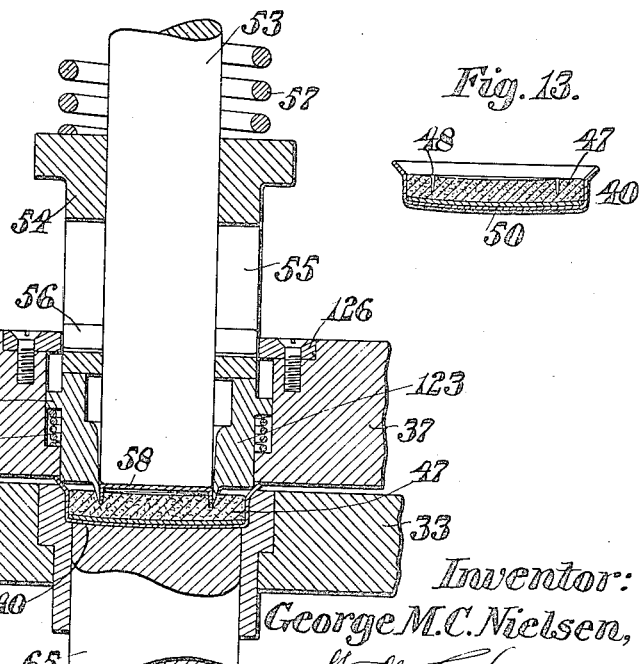

GEORGE M. C. NIELSEN, OF MILLIS, MASSACHUSETTS, ASSIGNOR TO UNITED CORK & SEAL CO., OF MILLIS, MASSACHUSETTS, A CORPORATION OF MAINE.

MACHINE FOR MAKING BOTTLE-CAPS.

1,195,392.   Specification of Letters Patent.   Patented Aug. 22, 1916.

Application filed April 28, 1909. Serial No. 493,051.

*To all whom it may concern:*

Be it known that I, GEORGE M. C. NIELSEN, a citizen of the United States of America, and a resident of Millis, in the county of Norfolk and State of Massachusetts, have invented certain new and useful Improvements in Machines for Making Bottle-Caps, of which the following is a specification.

This invention relates to an apparatus for manufacturing bottle caps and particularly to that class of caps which are provided with a lining of cork secured to the inner side of the cap by means of an adhesive.

It has for its object the provision of means for assembling the various parts of the cap and when thus assembled, subjecting them to heat to cause the adhesive to adhere to the cork and the cap between which it is interposed and then subjecting the cap to pressure for a limited length of time and subjecting the cap to the action of a cold air blast while under pressure.

Another object of the invention is to provide a means for protecting the inner face of the cork lining from the action of the contents with which the bottles on which the caps are used are filled.

The invention consists in certain novel features of construction and arrangement of parts which will be readily understood by reference to the description of the drawings and to the claims hereinafter given.

Of the drawings: Figure 1 is a side elevation of one end of a machine embodying the features of this invention, portions thereof being cut in section on line 1—1 on Fig. 3. Fig. 2 is a rear elevation of the same. Fig. 3 is a horizontal section of the same, the cutting plane being on line 3—3 on Fig. 2. Fig. 4 is an enlarged vertical section of the devices for stamping out the protecting plates, the cutting plane being on line 4—4 on Figs. 1 and 3. Fig. 5 is a vertical section of the end of the machine opposite to that shown in Fig. 1. Fig. 6 is an enlarged transverse section of a portion of the same, the cutting plane being on line 6—6 on Fig. 5. Fig. 7 is a plan of a portion of the chain conveyer, showing a completed cap supported thereon. Fig. 8 is an enlarged vertical section showing the cutting dies for cutting out the cork protecting plates from strips of facing material. Fig. 9 is a plan of a blank cut from the sheet of facing material by the cutting die. Fig. 10 is an inverted plan of the protecting plate after an annular flange has been formed thereon. Fig. 11 is a vertical section similar to Fig. 8 showing the positions of the various parts assumed after the annular flange has been formed upon the protector plate. Fig. 12 is a sectional elevation, the cutting plane being on line 12—12 on Fig. 3 and showing the various devices for cutting the annular groove in the cork lining to the cap, placing the flanged protector plate thereon, and forcing the flange thereof into said annular groove. Fig. 13 is a section of a cap after the annular groove has been cut into the cork lining in which condition it is positioned beneath the plunger, adapted to force the protecting plate therein. Fig. 14 is an enlarged section showing the operation of the device for forcing the protecting plate into the annular groove in the cork lining, and Fig. 15 is a section of the completed seal with the protector plate therein.

Similar characters designate like parts throughout the several figures of the drawings.

In the drawings, 10 represents a bed mounted on any suitable supports such as the legs 11 and provided with the upwardly extending guide members 12 in the upper end of which is mounted a revoluble crank shaft 13, the outer end of which is preferably supported in a bracket 14 and has secured thereto a pulley 15 through which power is imparted by means of the belt 16 to said crank shaft 13. The cranks 17 formed upon or secured to the shaft 13 are connected by links 18 to a member 19 adapted to be vertically reciprocated on the guides 12 during the revolution of the shaft 13. The crank shaft 13 has also secured thereto a bevel gear 20 meshing with a similar bevel gear 21 secured to a vertical shaft 22 having at its upper end a bearing 23 in the bracket 14. Keyed to the lower end of this shaft is a large gear 24 meshing with a smaller gear 25 supported upon a stud 26 secured to the under side of the bed 10. The hub of the gear 25 has formed thereon a crank arm 27, the outer end of which is provided with a roller adapted to engage with the radial slots 28 in a disk 29 revolubly mounted upon the lower end of the shaft 22 and thus cause an intermittent movement of a small gear 30 formed upon and movable with said disk plate 29. This smaller gear 30 meshes with a large gear 31 keyed to the shaft 32, shown in dotted lines in Fig. 3, the upper end of said shaft 32 having secured thereto so as to be revoluble therewith a large dial plate 33. The gear 31 also meshes with a smaller gear 34 secured upon the lower end of the shaft 35 mounted in a vertical bearing 36 secured to the side of the bed plate 10, the upper end of said shaft 35 having keyed thereto a smaller dial plate 37, the lower face of which coincides with the upper face of the dial plate 33.

The dial plate 33 rests upon a bolster plate 38 secured to the upper face of the bed 10, the upper face of the dial plate 33 being provided with a plurality of pockets 39, each one of which is adapted to receive a cup-shaped metal cap 40 such as is shown in Figs. 13 and 15. These cup-shaped members are fed into the pockets 39 at the front of the machine in any well-known manner either by any well-known automatic feeding device or they may be fed thereto by hand, if desired. Preferably these cup-shaped members are fed automatically to the pockets 39 at the point 41, as indicated in Fig. 3 of the drawings, and then by the rotation of the dial plate 33 they are carried by the intermittent movements of said dial plate to the position 42, indicated in Fig. 3, where each in its turn receives a circular disk of adhesive material cut from any suitable source of supply and placed in the bottom of the cup-shaped member by the downward movement of the plunger 43 secured to the under face of the reciprocating member 19. The further rotation of the dial plate carries the cup-shaped members successively to the position indicated at 44 on Fig. 3 where each cup-shaped member is supplied with a cork filling, these disks of cork being fed thereto in any well-known manner, either automatically or otherwise, as desired. The metal cup-shaped member, with the disk of adhesive material and the layer of cork therein is then moved with the dial 33 into a position beneath the bunter 45 which, in the downward movement of the reciprocating frame 19, forces the cork filling onto the adhesive material and insures a proper seating of the same within said cup-shaped member. A pilot pin 46 securely attached to the reciprocating frame 19 is adapted in the downward movement of said frame 19 to enter one of the holes 47 of the dial plate 33 and thereby position the dial plate on the completion of each of its successive movements, thus insuring steadiness during the various operations and also acting as a lock to prevent further movement of said dial plate until the operations in progress are completed. When the cap has passed from beneath the bunter 45 it is in condition to receive the metal facing or protector plate which constitutes one of the most important features of this invention. In order to provide for this a grooved cutter 46 is adjustably secured to the reciprocating frame 19 and in its downward movement the cutting edge thereon cuts into the layer of cork 47 within the metal cup-shaped member 40 an annular groove 48, when said cup-shaped member 40 is in the position 49 indicated in Fig. 3 of the drawings. The next movement of the dial 33 carries the cup-shaped member 40 with its disk of adhesive material 50 and its lining of cork 47 having the annular groove 48 cut in its upper face into the position 51 beneath an open ended pocket 52 in the small dial 37, the pocket 52 and the pocket 39 being in axial alinement and also in axial alinement with a plunger 53 secured to the under face of the reciprocating member 19. This plunger 53 has slidably mounted thereon a sleeve 54 provided with slots 55 into which project the ends of a pin 56 passing through said plunger 53 to limit the movement of said sleeve in either direction, said sleeve being normally retained in the position shown in Fig. 12 of the drawings by means of a spiral spring 57 surrounding said plunger 53. When the cup-shaped member 40 is thus positioned at 51 beneath the pocket 52, the pocket 52 contains a metal protector plate 58 provided with an annular flange 59 which extends downwardly in said pocket 52 in position to be forced by the downward movement of the plunger 53 into the annular groove 48 formed in the cork disk 47 in the cup-shaped member 40, thus leaving the cup-shaped member provided with the protector plate 58, as shown in Fig. 15 of the drawings, this protector plate, when the caps are in use, being adapted to cover the opening of the mouth of the bottle to which the cap or seal is secured to prevent the contents of the bottle from acting upon the cork lining to cause its deterioration and consequential disintegration which permits small particles of cork to drop into the contents of the bottle to its manifest injury. During this operation the pilot pin 60 secured to the reciprocating member 19 enters one of the holes 61 in the small dial 37 and accurately registers the dial during the operation of the plunger 53, the sleeve 54 being retracted against the tension of the spring 57 during the operation of the plunger. The next movement of the dial 33 brings the cup-shaped member 40 to the position 63 indicated in Fig. 3 of the drawing in which position the downward movement of the plunger 64 secured to the reciprocating member 19 acts upon the protector plate 58 to slightly cup the same, as indicated in Fig. 15 of the drawings.

The bottoms of each of the pockets 39 of the dial plate 33 are formed by the plungers 65 traveling in an annular groove 66 in the bolster plate 38. In the bottom of the groove 66 is secured a cam member 67 slightly in advance of the position 63, indicated in Fig. 3 of the drawings, so that as the disk 33 continues to rotate after the metal protector plate 58 has been subjected to the action of the bunter 64 the cam 67 will act upon these plungers 65 to elevate them and force the cup-shaped members 40 out of the pockets 39 in the dial plate 33. While the plungers 65 are in such elevated position upon the cam 67 and supporting the cup-shaped members 40 these members 40 come into contact with a deflector plate 68 which causes the cup-shaped members to be dropped into an inclined chute 69, the opposite end of which delivers the cup-shaped members to a continuous chain carrier 70, each link of which is provided with a central opening and is constructed to receive one of the cup-shaped members 40. The plungers 65 are returned to their seats by means of a bunter pin 45* similar to 45 which insures a proper pocket being ready to receive the cups at the feeding point 41. The chain 70 is supported by a tray 71 having side flanges or guides, said tray being provided with two long slots or perforations 71ª and 71ᵇ extending through the bottom thereof. Beneath one of the perforations 71ª in the bottom of the tray 71 is a slotted gas pipe 72 to which gas is supplied through the pipe 73 from any suitable source. When the gas passing from the slots or jets in the pipe 72 is ignited and the flames therefrom come into contact with the outer face of the cup-shaped member 40 supported by the perforated chain carrier 70, the heat from said gas flames will act upon the adhesive material contained within the cup-shaped members 40 and soften the same, making it more tacky. Immediately above the chain 70 is another endless chain 74 provided with a plurality of pressure members 75 adapted to enter the cup-shaped member 40 and force the cork disk 47 and disk of adhesive 50 into closer contact with each other and the inner end of the member 40. After the members 40 have been subjected to the heat from the gas jets of the pipe 72 the chain 74 comes into contact with a pressure plate 76 located over the second slot or perforation 71ᵇ in the tray 71 and adjustable toward and from the chain 70 and its track or tray 71 by means of the adjusting screws 77 in the frames 78. By means of these adjusting screws 77 the position of the pressure plate may be regulated relative to the track or tray 71 and beneath this second slot is a pipe 79 provided at its top with a plurality of slots through which cold air may pass or be forced from any suitable source of supply communicating with said pipe 79 by the pipe 80 to set the adhesive while under pressure. It is obvious therefore that as the members 40 pass over the gas flames the adhesive material is subjected to the heat therefrom and becomes tacky and when in this tacky condition the continued movement of the carriers 70 and 74 causes the pressure members 75, contacting with the protector plate 58 to be pressed downwardly to insure the firm adherence of the cork to the cap through the instrumentalities of the disk of adhesive material, and while pressure is being thus subjected to the contents of the cup-shaped member 40, the exterior of the cup-shaped member is being subjected to a blast of cold air to cool the same and insure the adherence of the various members of the seal. As the chain 70 passes over the sprocket wheel 81, the finished caps fall off into any suitable receptacle. The sprocket wheel 81 is revolubly mounted upon a shaft 82 mounted in any suitable bearing in a framework 83, the opposite end of the chain 70 being mounted upon a similar sprocket wheel 84 on a shaft 85 driven by means of a pulley 96 which is secured thereon. A gear 86 secured to the shaft 85 meshes with a similar gear 87 on the shaft 88 and on this shaft 88 is a sprocket wheel 89 connected by means of a sprocket chain 90 to a sprocket wheel 91 on a shaft 92 mounted in the framework 83. This shaft 92 has also mounted thereon a sprocket wheel wheel 93 driving the endless chain 74, the opposite end of which is mounted upon the sprocket wheel 94 on the shaft 95. It is obvious that by this construction of driving mechanism the chains 70 and 74 are driven in unison.

Secured to the bed 10 are suitable brackets 97—97* supporting an auxiliary table 98, one end of which is provided with suitable bearings 99 for a shaft 100 upon which is revolubly mounted a reel 101 containing a strip 102 of suitable facing material such as tin, which is adapted to travel along a groove in the upper face of the auxiliary table 98 which extends diametrically of the dial plate 37 and slightly above the same. This strip of material 102 is fed along said groove in the table 98 by means of a suitable feeding mechanism, to be hereinafter described, beneath suitable devices for punching out from the strip of material a flat disk and then by means of forming tools acting in conjunction with the aforesaid punch, upsetting the edges of the disk to form an annular flange of the right diameter to fit the annular groove in the cork filling.

Secured to the upper face of the auxiliary table 98 is a bearing 103 in which is mounted a punch 104, the upper end of which is provided with an annular groove which is engaged by a forked member 105 secured by screws 106 to the reciprocating member 19. The lower end of the punch 104 is provided with a cylindrical chamber in which is mounted a plunger 107, the stem of which is provided with a pin 108 extending into a diametral slot 109 in said punch, this pin 108 co-acting with the ends of the slot 109 to limit the movement of the plunger 107 in either direction. A spring 110 in a suitable socket in the punch 104 normally retains the plunger in its lowermost position, as indicated in Fig. 4, with the pin 108 at the lower end of the slot 109. The auxiliary table 98 is provided with an opening therethrough in axial line with said punch 104 and has set therein an annular member 111 with a shearing edge, the interior diameter of which coincides with the exterior diameter of the punch 104. It is obvious, therefore, that as the strip of material 102 is fed along the groove in the upper face of the auxiliary table 98 over the annular member 111, that any downward movement of the reciprocating member 19 will cause the punch 104 to operate upon the strip of material and punch therefrom a circular disk or blank 112 suitable to form the protector plate 58. The spring 110 is only strong enough to force the plunger 107 downward after the cutting of the blank is completed, this plunger 107 in its downward movement resting upon the strip of material until the punch 104 has performed its function in cutting the blank 112 from said strip. In axial line with said plunger 107 is an auxiliary plunger 113 sliding in the bracket 97*, this plunger 113 being forced upwardly by means of a lever 114 pivoted at 115 to a bracket 116 secured to the lower side of the bed 10. A rod 117, pivoted to the opposite end of said lever 114 and having a bearing in an ear 118 formed upon the bed 10, is normally held in raised position by means of a spring 119 interposed between said ear 118 and a collar 120 secured to said rod 117.

The upper end of the rod 117 extends into a socket 121 secured to a rod 122 attached to the under side of the reciprocating member 19. The normal positions of the punch 104 and plungers 107 and 113 are as indicated in Fig. 4 of the drawings. When, however, the reciprocating member 19 moves downwardly the forked member 105 on this member acts upon the punch 104 and moves it downwardly into contact with the strip of material 102 and continuing its downward movement the punch coöperating with the shearing edge of the annular member 111 cuts from the strip of material a blank 112 which is forced downwardly in advance of the punch 104 and the spring-pressed plunger 107 therein until the end of the punch has nearly reached the end of its downward movement. At this time the downward movement of the rod 122 will cause the lower end of the socket 121 to come into contact with the upper end of the rod 117 and cause the lever 114 to operate so that the plunger 113 will be raised and come into contact with the blank 112 and force this blank against the plunger 107 causing the spring 110 to be compressed, this operation causing the flange 59 to be formed upon the blank 112, as indicated in Figs. 8, 10, and 11 of the drawings. As the member 19 moves upwardly the auxiliary plunger 113 will be moved downwardly as indicated in Fig. 11 and the punch 104 will be moved upwardly as indicated in the same figure. The spring 110, however, will have sufficient tension to cause the plunger 107 to move downwardly at this time following the movement of the plunger 113 until the pin 108 reaches the lower end of the slot 109, when further downward movement of the plunger 107 and the protector plate 58 will cease while the auxiliary plunger 113 continuing its downward movement will separate itself from the protector plate 58 and return to its normal position. A continuation of the upward movement of the punch 104 will act upon the pin 108 to raise the plunger 107 and return both the punch 104 and the plunger 107 to their normal positions leaving the protector plate 58 within the cylindrical chamber of one of the annular members 123, one of which is located in each of a plurality of cylindrical openings in the dial plate 37. Each of the members 123 is provided with an outwardly extending flange 124 which by a spring 125 is forced into engagement with a retaining ring 126 set into the upper face of the dial plate 37. The lower face of the member 123 is provided with an annular wedge-shaped lip 127, the diameter of which coincides with the diameter of the cutting edge of the groove cutter 46. When the punch 104 and plungers 107 and 113 have returned to their normal positions and the protector plate 58 has been formed and left within the member 123, a rotation of the dial plate 37 will bring the member 58 into the position 51 indicated on Fig. 3 of the drawings, beneath the plunger 53. The downward movement of the member 19 carries with it by means of the spring 57 the sleeve 54 which comes into contact with the upper end of the annular member 123 and owing to the greater tension of the spring 57 over that of the spring 125 the member 123 is forced downwardly so that the wedge-shaped annular lip 127 thereon will enter the annular groove 48 in the cork lining 47 and open up this groove 48 for the admission of the flange 59 of said cup-shaped protector plate 58, the plunger 53 coming into contact with the outer face of this member 58 and forcing it into the groove 48 as soon as it has been opened up by the wedge-shaped annular lip 127. The upward movement of the member 19 returns the plunger 53 and the spring-pressed members 54 and 123 to their normal positions and when this has been accomplished the cup-shaped member 40 with its cork lining and protector plate therein is free to be moved in its pocket in the dial 33 into other positions and finally delivered from said dial onto the endless chains where it is subjected to heat pressure and then a cooling blast, as has been previously described.

A strip 102 is fed from the reel 101 along the groove in the upper face of the auxiliary table 98 by means of a feeding mechanism of any well-known pinch-feed type. The reciprocating movement is given to the feeding mechanism by means of a bell crank lever 128 pivoted at 129, one arm of which is forked and supports the trunnions 130 of the upper jaw 131 of the feeding mechanism while the other arm has pivotally connected thereto a rod 132 having a bearing in an ear 133 secured to the under side of the reciprocating member 19. Beneath the ear 133 is a collar 134 secured to said rod 132, while said rod is also provided with another collar 135 above said ear between which and said collar is interposed a spring 136, which, by its tension, keeps the rod 132 in a raised position until in the downward movement of the reciprocating member 19, the ear 133 comes into contact with the collar 134 and moves the bell crank lever 128 about its pivot 129 until it engages with the shoulder 137, which forms a stop to limit the movement of the bell crank lever in that direction. On the upward movement of the member 19 the spring 136 will act upon the collar 135 to move the bell crank lever in the opposite direction until it engages the stop 138, these stops 137—138 limiting the movement of feed of the strip 102 during any single reciprocation of the member 19. During the movement of the bell crank lever 128 about its pivot toward the stop 137 the jaw 131 will be opened by the action of the ear 139 pivotally mounted upon the reciprocating member 19 coming into contact with the spring 140 resting upon the collar 141 secured to a rod 142 pivotally secured to the rearwardly extending arm of the jaw 131, said rod 142 passing through an ear 139 and being provided with a collar 143 above said ear 139 between which and said collar is interposed a second spring 144. It is obvious that the spring 144 normally retains the jaw 131 in contact with the strip of material 102 and pinches the same between it and the fixed jaw during the forward movement of the lever 128, thus positively feeding the strip of material 102 the required distance along the groove in the auxiliary plate.

This provides a very effective apparatus whereby the various elements forming the cap may be assembled together and fixedly secured in position while a protector plate is formed during the same operation and fixed to the lining to the bottle cap in such position that when in use the cork lining to the cap will not be exposed to the action of the contents of the bottle to which the cap is secured.

It is believed that the operation and many advantages of the invention will be thoroughly understood from the foregoing.

Having thus described my invention, I claim:

1. In an apparatus of the class described, the combination of a support provided with a pocket adapted to receive a flanged bottle cap containing a layer of cork; means for forcing into the face of said layer of cork a metal plate, the outer edge of which is removed from the inner wall of said flange; and mechanism for moving said support and forcing means relative to each other and positioning them in axial alinement during the insertion of said metal plate.

2. In an apparatus of the class described, the combination of a support provided with a pocket adapted to receive a flanged bottle cap containing a layer of cork; means for forcing into the face of said layer of cork a flanged metal plate, the outer wall of which is separated from the inner wall of the flange on said cap; and mechanism for moving said support and forcing means relative to each other and positioning them in axial alinement during the insertion of said metal plate.

3. In an apparatus of the class described, the combination of a support provided with a pocket adapted to receive a flanged bottle cap containing a layer of cork; means for forcing into the center of the face of said layer of cork a metal plate of less diameter than said cap, the outer edge of which is separated from the flange of said cap; and mechanism for moving said support and forcing means relative to each other and positioning them in axial alinement during the insertion of said metal plate.

4. In an apparatus of the class described, the combination of a support provided with a pocket adapted to receive a bottle cap containing a layer of cork; means for forming a circular flanged metal plate; means for positioning said plate with its center centrally disposed relative to said bottle cap and means for forcing the flange of said plate into said cork.

5. In an apparatus of the class described, the combination of a movable support provided with a pocket adapted to receive a bottle cap containing a layer of cork; mechanism for forming a flange upon a circular metal plate; means for positioning said cap beneath said flanged plate with their centers opposite each other; and means for forcing said flange into said cork.

6. In an apparatus of the class described, the combination of a support provided with a pocket adapted to receive a bottle cap containing a layer of cork; a reciprocating device for cutting an annular groove in said cork; mechanism for forming a flanged circular metal plate; and a device for forcing the flange of said plate into said groove.

7. In an apparatus of the class described, the combination of a movable support provided with a pocket adapted to receive a bottle cap containing a layer of cork; a reciprocating device for cutting an annular groove in said cork; mechanism for forming a flanged circular metal plate; a device for forcing the flange of said plate into said groove; and means for moving said support to successively position said cap beneath said groove-cutting device and then beneath said plate-forcing device.

8. In an apparatus of the class described, the combination of a movable support provided with a plurality of pockets each adapted to receive a bottle cap containing a layer of cork; a reciprocating device for cutting an annular groove in said cork; mechanism for forming a flanged circular metal plate; a device for forcing the flange of said plate into said groove; and means for moving said support to successively position said cap beneath said groove-cutting device and then beneath said plate forcing device.

9. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; and means for moving said support to successively position said cap beneath said groove-cutting device and then beneath said plate-forcing device.

10. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; and means for applying heat to said cap to cause said adhesive to adhere to said cork and the inner face of said cap.

11. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; and a series of gas jets for applying heat to said cap to cause said adhesive to adhere to said cork and the inner face of said cap.

12. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; a series of gas jets; and means for carrying said caps over said jets to permit the heat therefrom to act upon said adhesive.

13. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; means for applying heat to said cap to cause said adhesive to adhere to said cork and the inner face of said cap; and means for applying pressure to the cork while the adhesive is in a heated state.

14. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; means for applying heat to said cap to cause said adhesive to adhere to said cork and the inner face of said cap; means for applying pressure to the cork while the adhesive is in a heated state; and means for cooling said cap.

15. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; means for applying heat to said cap to cause said adhesive to adhere to said cork and the inner face of said cap; means for applying pressure to the cork while the adhesive is in a heated state; and means for cooling said cap while pressure is applied thereto.

16. In an apparatus of the class described, the combination of a movable support provided with a plurality of pockets each adapted to receive a bottle cap containing a disk of adhesive and a layer of cork; a reciprocating device for cutting an annular groove in said cork; mechanism for forming a flanged circular metal plate; a device for forcing the flange of said plate into said groove; means for moving said support to successively position said cap beneath said groove-cutting device and then beneath said plate-forcing device; a series of gas jets; and a chain for carrying said caps over said jets to permit the heat therefrom to act upon said adhesive.

17. In an apparatus of the class described, the combination of a movable carrier provided in its upper face with a plurality of perforated recesses each adapted to support a bottle cap containing a layer of cork and a disk of adhesive between said cap and cork; means for supplying heat located beneath said movable carrier; and means for moving said carrier into position for the caps thereon to be acted upon by said heat.

18. In an apparatus of the class described, the combination of a movable carrier provided in its upper face with a plurality of perforated recesses each adapted to support a bottle cap containing a layer of cork and a disk of adhesive between said cap and cork; means for supplying heat located beneath said movable carrier; means for moving said carrier into position for the caps thereon to be acted upon by said heat; and means for applying pressure to said caps while said adhesive is in heated state.

19. In an apparatus of the class described, the combination of a movable carrier provided in its upper face with a plurality of perforated recesses each adapted to support a bottle cap containing a layer of cork and a disk of adhesive between said cap and cork; means for supplying heat located beneath said carrier; means for moving said carrier into position for the caps thereon to be acted upon by said heat; means for applying pressure to said caps while said adhesive is in heated state; and means located beneath said carrier for cooling said caps while under pressure.

20. In an apparatus of the class described, the combination of an endless chain carrier each link of which is adapted to support intermediate its ends a bottle cap containing a layer of cork and a disk of adhesive between said cap and cork; means for supplying heat; and means for moving said carrier into position for the caps to be acted upon by said heat.

21. In an apparatus of the class described, the combination of an endless movable carrier provided in its upper face with a plurality of perforated recesses each adapted to support a bottle cap containing a layer of cork and a disk of adhesive between said cap and cork; a plurality of gas jets for supplying heat; and means for moving said carrier into position for the caps thereon to be acted upon by said heat.

22. In an apparatus of the class described, the combination of an endless carrier each link of which is provided with a recess in its upper face intermediate its ends adapted to support a bottle cap containing a layer of cork and a disk of adhesive between said cap and cork; a plurality of gas jets for supplying heat located beneath said carrier; means for moving said carrier into position for the caps to be acted upon by said heat; and means for subsequently cooling said caps.

23. In an apparatus of the class described, the combination of an endless movable carrier provided with a plurality of recesses in its upper face each adapted to support a bottle cap containing a layer of cork and a disk of adhesive; a plurality of gas jets; a perforated air pipe for supplying a blast of cold air; means for moving said carrier over said jets and then over said air pipe; and means moving in unison with said carrier for applying pressure to said cork layers in said caps while passing over said air pipe.

24. In an apparatus of the class described, the combination of an endless chain carrier each link of which is provided in its upper face intermediate its ends with a recess adapted to support and position a bottle cap containing a layer of cork and a disk of adhesive; a plurality of gas jets located beneath said carrier; a perforated air pipe also located beneath said carrier for supplying a blast of cold air; means for moving said carrier over said jets and then over said air pipe; supporting guides for said carrier; and means moving in unison with and above said carrier for applying pressure to said cork layers in said caps while passing over said air pipe.

25. In an apparatus of the class described, the combination of an endless chain carrier each link of which is provided in its upper face intermediate its ends with a recess adapted to support a bottle cap containing a layer of cork and a disk of adhesive; a plurality of gas jets located beneath said carrier; a perforated air pipe also located beneath said carrier adapted to supply a blast of cold air; means for moving said carrier over said jets and then over said air pipe; perforated supporting guides for said carrier; and means moving in unison with said carrier for applying pressure to said cork layers in said caps while passing over said air pipe.

26. In an apparatus of the class described, the combination of an endless carrier provided in its upper face intermediate its ends with a plurality of recesses each adapted to support a bottle cap containing a layer of cork and a disk of adhesive; a plurality of gas jets located beneath said carrier; a perforated air pipe also located beneath said carrier for supplying a blast of cold air; means for moving said carrier over said jets and then over said air pipe; a second carrier moving in unison with said endless carrier and provided with a plurality of pressure members adapted to enter said caps; and a pressure bar above said air pipe adapted to act on said second carrier to apply pressure to the cork layers in said caps while passing over said air pipe.

27. In an apparatus of the class described, the combination of a carrier provided in its upper face with a plurality of perforated recesses each adapted to support a bottle cap containing a layer of cork and a disk of adhesive; guides therefor; a plurality of gas jets; a perforated air pipe for supplying a blast of cold air; means for moving said carrier over said jets and then over said air pipe; a second carrier provided with a plurality of pressure members adapted to enter said caps; a pressure bar above said air pipe adapted to act on said second carrier to apply pressure to the cork layers in said caps while passing over said air pipe; and means for adjusting said pressure bar toward and from said guides.

28. In an apparatus of the class described, the combination of a carrier provided in its upper face with a plurality of perforated recesses each adapted to support a bottle cap containing a layer of cork and a disk of adhesive; guides therefor; a plurality of gas jets; a perforated air pipe for supplying a blast of cold air; means for moving said carrier over said jets and then over said air pipe; a second carrier provided with a plurality of pressure members adapted to enter said caps; a pressure bar above said air pipe adapted to act on said second carrier to apply pressure to the cork layers in said caps while passing over said air pipe; means for adjusting said pressure bar toward and from said guides; and mechanism interposed between said carriers to drive them in unison.

29. In an apparatus of the class described, the combination of a perforated table; a device for feeding a strip of material into position over the perforation in said table; a reciprocating punch adapted to enter said perforation and cut a blank from said strip of material; a spring-pressed plunger in said punch, with its outer end normally beyond the end of said punch but adapted to be withdrawn a limited distance within said punch; means coöperating with said punch and plunger and in axial alinement therewith to form a flange on said blank; and a rotatable member beneath said table provided with a pocket adapted to receive said blank.

30. In an apparatus of the class described, the combination of a perforated table; a device for feeding a strip of material into position over the perforation in said table; a reciprocating punch adapted to enter said perforation and cut a blank from said strip of material; a spring-pressed plunger in said punch, with its outer end normally beyond the end of said punch but adapted to be withdrawn a limited distance within said punch; a second plunger coöperating with said punch and plunger and in axial alinement therewith to form a flange on said blank; and a rotatable member beneath said table provided with a pocket adapted to receive said blank.

31. In an apparatus of the class described, the combination of a perforated table; a device for feeding a strip of material into position over the perforation in said table; a reciprocating punch adapted to enter said perforation and cut a blank from said strip of material; a spring-pressed plunger in said punch, with its outer end normally beyond the end of said punch but adapted to be withdrawn a limited distance within said punch; means coöperating with said punch and plunger to form a flange on said blank; a rotatable member beneath said table provided with a yielding annular member adapted to receive said flanged blank and provided with an annular lip on its under face; a support for a bottle cap provided with a lining of cork having an annular groove in its face; and a reciprocating member adapted first to force said lip into said annular groove in the cork lining of said cap and then force the flange of said blank into said groove.

32. In an apparatus of the class described, the combination of a perforated table; a device for feeding a strip of material into position over said perforation in said table; a reciprocating punch adapted to enter said perforation and cut a blank from said strip of material; plungers on opposite sides of said blank for forming a flange thereon; a rotatable plate beneath said table provided with a pocket adapted to receive said flanged blank; means for depositing said flanged blank in said pocket; means for rotating said plate to position said pocket above a supported cork-lined bottle cap; a plunger above said pocket; and means for operating said plunger to force the flanged blank from said pocket into the cork lining of said cap.

33. In an apparatus of the class described, the combination of a reciprocating member; a perforated table beneath said member; a device for feeding a strip of material over and of the same diameter as the perforation in said table; a punch over said perforation moved by said reciprocating member and adapted to cut a blank from said strip of material; a spring-pressed plunger within said punch of the same diameter as the finished cap to be made from said blank; means for limiting the movement of said plunger in either direction relative to said punch; a second plunger beneath said perforation having a radius less than the radius of the upper plunger equal to the thickness of said strip of material; a pivoted lever connected to said second plunger; and a divided member between said lever and reciprocating member providing a means whereby only the latter part of the movement of said reciprocating member is imparted to said second plunger.

34. In an apparatus of the class described, the combination of a support for a bottle cap containing a cork lining; means for cutting an annular groove in said cork; means for forming a flanged metal protecting plate; means for separating the walls of said annular groove; and means for forcing said flange of said plate into said groove.

35. In an apparatus of the class described, the combination of a support for a bottle cap containing a cork lining; means for cutting an annular groove in said cork; means for forming a flanged metal protecting plate; means for separating the walls of said annular groove; and means for forcing said flange of said plate into said groove while the walls of said groove are separated.

36. In an apparatus of the class described, the combination of a support for a bottle cap containing a cork lining; means for cutting an annular groove in said cork; means for forming a flanged metal protecting plate; a member with an annular wedge lip for separating the walls of said annular groove; and means for forcing said flange of said plate into said groove while said wedge lip remains in said groove.

37. In an apparatus of the class described, the combination of a support for a bottle cap containing a cork lining; of means for cutting an annular groove in said cork; means for forming a flanged metal protecting plate; a member with an annular wedge lip for separating the walls of said annular groove; and a reciprocating plunger for forcing said flange of said plate into said groove while said wedge lip remains in said groove.

38. In an apparatus of the class described, the combination of a rotatable dial provided with an opening therethrough; a support for said dial provided with an annular groove; a plunger in said opening adapted to travel in said groove with its top forming the bottom of a pocket adapted to receive an inverted bottle cap lined with cork; means for subjecting the cork to pressure; means for inserting a metal protector plate into said cork; and a cam in said groove adapted to lift said plunger in the rotation of said dial and remove said cap from said pocket.

39. In an apparatus of the class described, the combination of two rotatable dials, the edge of one of which projects over the edge of the other and is provided with a pocket extending therethrough adapted to receive a protector plate, while the edge of the other is provided with a plurality of pockets each adapted to receive a bottle cap lined with cork; a reciprocating member above said dials; pins on said member for preventing the rotation of said dials during the reciprocation of said member; a cutter on said member for cutting an annular groove in said cork; means for supplying a protector plate to the pocket in the upper dial; and means secured to said reciprocating member for forcing said protector plate from said pocket into said cork.

40. In an apparatus of the class described, the combination of two rotatable dials, the edge of one of which projects over the edge of the other and is provided with a pocket extending therethrough adapted to receive a protector plate, while the edge of the other is provided with a plurality of pockets each adapted to receive a bottle cap lined with cork; a reciprocating member above said dials; pins on said member for preventing the rotation of said dials during the reciprocation of said member; a cutter on said member for cutting an annular groove in said cork; means for supplying a protector plate to the pocket in the upper dial; means secured to said reciprocating member for forcing said protector plate from said pocket into said cork; and means for expelling said caps from said pockets.

Signed by me at 4 Post Office Sq., Boston, Mass., this 10th day of April, 1909.

GEORGE M. C. NIELSEN.

Witnesses:
WALTER E. LOMBARD,
HOWARD HANSCOM.